(12) United States Patent
Messina et al.

(10) Patent No.: US 7,139,397 B2
(45) Date of Patent: Nov. 21, 2006

(54) HYBRID ARCHITECTURE FOR REALIZING A RANDOM NUMBERS GENERATOR

(75) Inventors: Marco Messina, Augusta (IT); Salvatore Polizzi, San Giovanni La Punta (IT); Giulio Mangione, Reggio Calabria (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 795 days.

(21) Appl. No.: 10/199,965

(22) Filed: Jul. 18, 2002

(65) Prior Publication Data

US 2003/0059046 A1     Mar. 27, 2003

Related U.S. Application Data

(60) Provisional application No. 60/307,002, filed on Jul. 20, 2001.

(51) Int. Cl.
*H04L 9/00* (2006.01)
(52) U.S. Cl. .................... 380/46; 708/250; 708/255
(58) Field of Classification Search ............. 380/46; 708/250, 255
See application file for complete search history.

(56) References Cited

U.S. PATENT DOCUMENTS

| | | | | |
|---|---|---|---|---|
| 3,790,768 A | * | 2/1974 | Chevalier et al. | 708/251 |
| 3,920,894 A | * | 11/1975 | Shirley et al. | 380/46 |
| 4,078,159 A | * | 3/1978 | Lender et al. | 375/214 |
| 4,220,953 A | * | 9/1980 | Carre | 342/94 |
| 4,291,386 A | * | 9/1981 | Bass | 708/252 |
| 4,340,912 A | * | 7/1982 | Troxel | 358/3.19 |
| 4,386,913 A | * | 6/1983 | Assard | 434/9 |
| 4,434,323 A | * | 2/1984 | Levine et al. | 380/260 |
| 4,476,566 A | * | 10/1984 | Dent | 375/132 |
| 4,513,386 A | * | 4/1985 | Glazer | 708/255 |
| 4,516,220 A | * | 5/1985 | Baumann | 708/212 |
| 4,527,798 A | * | 7/1985 | Siekierski et al. | 463/17 |
| 4,755,969 A | * | 7/1988 | Pappas | 365/189.05 |
| 4,807,290 A | * | 2/1989 | Pospischil | 380/43 |
| 4,819,164 A | * | 4/1989 | Branson | 713/501 |
| 4,819,818 A | * | 4/1989 | Simkus et al. | 463/22 |
| 4,905,176 A | * | 2/1990 | Schulz | 708/252 |
| 4,962,529 A | * | 10/1990 | Saeki et al. | 380/226 |
| 5,007,087 A | * | 4/1991 | Bernstein et al. | 380/46 |
| 5,008,937 A | * | 4/1991 | Yamamura et al. | 380/252 |
| 5,039,989 A | * | 8/1991 | Welland et al. | 341/143 |
| 5,187,676 A | * | 2/1993 | DeVane | 708/251 |
| 5,218,559 A | * | 6/1993 | Angebaud et al. | 708/250 |
| 5,235,613 A | * | 8/1993 | Brown et al. | 375/135 |
| 5,239,494 A | * | 8/1993 | Golbeck | 708/3 |
| 5,351,300 A | * | 9/1994 | Quisquater et al. | 380/46 |
| 5,357,278 A | * | 10/1994 | Herz et al. | 375/240.01 |
| 5,422,892 A | * | 6/1995 | Hii et al. | 714/735 |
| 5,541,996 A | * | 7/1996 | Ridenour | 380/46 |
| 5,563,573 A | * | 10/1996 | Ng et al. | 338/334 |
| 5,566,099 A | * | 10/1996 | Shimada | 708/250 |
| 5,574,733 A | * | 11/1996 | Kim | 714/728 |
| 5,598,472 A | * | 1/1997 | Schuchman et al. | 380/215 |
| 5,633,816 A | * | 5/1997 | Wallace | 708/252 |

(Continued)

*Primary Examiner*—Ayaz Sheikh
*Assistant Examiner*—David García Cervetti
(74) *Attorney, Agent, or Firm*—Lisa K. Jorgenson; Robert Iannucci; Seed IP Law Group

(57) ABSTRACT

A hybrid architecture for realizing a random numbers generator comprising a digital circuitry portion able to provide for a random bytes sequence as well as an analog circuitry portion able to provide a seed of the true random type is described.

19 Claims, 2 Drawing Sheets

U.S. PATENT DOCUMENTS

| | | | |
|---|---|---|---|
| 5,850,450 A * | 12/1998 | Schweitzer et al. | 380/30 |
| 5,873,781 A * | 2/1999 | Keane | 463/22 |
| 5,946,257 A * | 8/1999 | Keeth | 365/226 |
| 6,046,616 A * | 4/2000 | Chan et al. | 327/164 |
| 6,065,029 A * | 5/2000 | Weiss | 708/251 |
| 6,128,390 A * | 10/2000 | Kimura et al. | 380/268 |
| 6,193,607 B1 * | 2/2001 | Kay | 463/22 |
| 6,253,223 B1 * | 6/2001 | Sprunk | 708/250 |
| 6,324,558 B1 * | 11/2001 | Wilber | 708/255 |
| 6,326,838 B1 * | 12/2001 | Kimura et al. | 327/552 |
| 6,593,788 B1 * | 7/2003 | Vogts | 327/164 |
| 6,636,833 B1 * | 10/2003 | Flitcroft et al. | 705/1 |
| 6,687,721 B1 * | 2/2004 | Wells et al. | 708/250 |
| 6,714,955 B1 * | 3/2004 | Le Quere | 708/250 |
| 6,745,217 B1 * | 6/2004 | Figotin et al. | 708/250 |
| 6,763,364 B1 * | 7/2004 | Wilber | 708/255 |
| 6,788,787 B1 * | 9/2004 | Shono et al. | 380/46 |
| 6,862,605 B1 * | 3/2005 | Wilber | 708/255 |

\* cited by examiner

HYBRID ARCHITECTURE FOR REALIZING A RANDOM NUMBERS GENERATOR

BACKGROUND OF THE INVENTION

1. Field of the Invention

The present invention relates to a hybrid architecture for realizing a random numbers generator.

In particular, the invention relates to an architecture having a hybrid digital/noising structure that can be integrated monolithically With the expression random numbers generator it is indicated a circuitry that can issue upon request one or more bytes not-correlated one to another, i.e. that can be defined as completely random.

The main object is to create a totally unpredictable bytes sequence, thus a sequence of bytes having a theoretically infinite period and an uniform distribution.

The scope is that of improving the features of a random numbers generator in order to reach the best possible statistical conditions.

2. Description of the Related Art

As it is well known, the random numbers generators are of increasing interest, in particular in the landscape of Internet applications, in relation with the need of obtaining electric transmission systems always surer and surer, using a more and more sophisticated cryptography system.

In particular, the Internet explosion will allow an increasing number of users to perform even more critical and complex operations, for example shopping on Web directly paid by credit cards, request for official documents or communication, or other no free of charge services. Such operations emphasize the need of digital authentication and certification device to be provided, as the electronic signature.

It is obvious that a sophisticated coding system would be as surer as the used key for the cryptographic algorithm is unknown and unpredictable.

It should be also noted that random numbers are also used in several scientific search and technology areas. So, the random number generators (RNG) are important devices for the simulation phase of a lot of phenomenons (for example, in the nuclear physic field), in all situation where impartial decisions are to be made, in evaluating the algorithms' complexity or in solving numerical analysis. In particular, a different application field would require a RNG with different properties.

The main characteristics of a cryptography system are the following:

secrecy: the message to be send should be decodified and read by the addressee only;
authentication: the addressee receiving a message should be sure of the sender identity;
integrity: the content of the message should be sure;
sender identity guarantee: the sender should be prevented to deny a message transmission (digital signature).

The object of a cryptographic algorithm is making as complex as possible the decodification of a cipher message without knowing the appropriate key. In case of a good working cryptographic algorithm, the only possible way in order to obtain a plain text from a cipher message is to try all possible key in order to identify the correct one: the number of proofs increases in an exponential manner with the key length.

So, the main operation in order to obtain a secure cryptographic system is the creation of the key, which should be as long and random as possible.

It should be noted that two main types of systems for generating random numbers are currently used.

Digital Systems

They are mainly pseudo-random generators. Such devices are based on a substantially digital core which can provide a numbers sequence having a really long period.

They can be assimilated to states machines which realize algorithms and extremely complex functions having a difficult capture. In most cases, the finding of the function which generates the sequence could even need hundred years of computational time.

In particular, in order to generate a random number, the known generator, implemented by computing system, uses random variables which are connected to the system or external to it.

Internal random variables of a computing system such as a personal computer (PC) are the following:

system status variables, like the clock time, the serial numbers of the PC (for example, the Ethernet serial number and so on);
the number of files stored in the hard disk or in a particular directory;
the empty space on the hard disk;
the information contained in several buffers of the computer, the I/O content or the video driver information;
the number of tasks within the operating system, the corresponding ID or sizes;
the central memory state;
information defined by the user (size or positioning of the windows, used colors, file names, . . . ).

The above listed internal variables are interesting from the point of view of their random character but show the limitation of the number of random bits they can provide and thus they are not so reliable from the secrecy point of view.

External random variables are the following:

content of the keys selected on the keyboard;
time length between one selected key and the following;
measures of time and position of the mouse movements;
arrival time of bit sequences on the network.

All the above listed external variables show a good random degree and are in some way dependent on the user actions.

In any case, the random sequence so obtained is generally not used per se but is processed by suitable algorithms in order to increase their random character and thus the security of the cipher message.

The most known techniques that provide for this kind of devices are the following:

LCG (Linear Congruence Generator) technique that provides for a numerical sequence of the type:

$$X_n = a_1 X_{n-1} + C \pmod{m} \qquad (1)$$

where m, a e C are the parameters that randomize the sequence, respectively known as module, multiplier and additional constant.

MRG (Multiple Recursive Generator) technique that provides for a numerical recurrent sequence of the type:

$$X_n = a_1 X_{n-1} + a_2 X_{n-2} + \ldots + a_k X_{n-k} \pmod{m} \qquad (2)$$

In particular, the above recurrent formula (2) corresponds to a primitive polinomy division and can be implemented by a so-called LFSR (Linear Feedback Shift Register), schematically shown in FIG. 1.

In particular, the LFSR 10 of FIG. 1 comprises a shift register 11 receiving a first input signal INPUT and providing an output signal OUT.

The shift register 11 is connected in a loop-like manner to a primitive polinomy generator 12, in turn receiving a second input signal IN.

Actually, in order to realize a pseudo-random generator according to the prior art techniques, a circuitry combining different LFSRs to obtain a more complicated sequence is used.

In particular, as schematically shown in FIG. 2, such a technique realizes a random numbers generator or RNG by means of combinations of LFSRs.

The generator RNG 20 of FIG. 2 comprises a first LFSR1, a second LFSR2 and a third register LFSR3, receiving an irregular clock signal issued by a clock generator 21 in turn comprising a set of clock oscillators CLK L1, CLK L2, CLK H1, CLK H2.

In particular, within the clock generator 21, the clock oscillator CLK L1 is connected to the clock oscillators CLK H1 and CLK H2, the clock oscillator CLK L2 is connected to the clock oscillators CLK H1 and CLK H2, the clock oscillator CLK H2 is connected to the clock oscillator CLK H1. Moreover, the output of the clock oscillator CLK H1 is connected to the registers LFSR1, LFSR2, LFSR3.

The first register LFSR1 is connected to the second register LFSR2, in turn connected to an output terminal OUT_RNG of the generator RNG 20.

Finally, the third register LFSR3 is connected to the first register LFSR1 by means of a scrambling device 22.

It is also known to combine the above described techniques.

The digital systems just described have the advantage of being totally reliable and of guaranteeing a sequence which is complicated at the most possible level but substantially always deterministic.

Analog Systems

Such techniques find their basis in the detection of natural phenomenons that are per se random. The most common used techniques are the followings:

Direct amplification of a noise, such as a thermal noise generated by a resistor or during a radioactive source emission.

Use of analog features of a chaotic circuit which is really sensible to parameters variations or to the initial conditions. In such a way, the common process imperfections or the reference voltage errors generate sequences totally not-correlated one to another.

Use of a composition of amplifiers, analog filters, connected to noise sources.

According to the first technique, a high gain and wide band amplifier is used in order to process a small signal issued form a thermal noise source (the so-called shot noise). The noise signal should be amplified up to a level whereat it can be compared by means of a comparator showing no bias and provided with a clock signal.

However, the absence of a suitable protection with respect to the noise source from external noises due to the power supply and to the substrate does not allow one to use such a technique in integrated applications.

On the contrary, according to the second technique, a chaotic circuit can be obtained, for example, from a cascade of n analog/digital converter (ADC) stages and a Sample & Hold circuit, in other words by means of a known n bit analog/digital (A/D) converter. In particular, such a chaotic circuit realizes the Bernoulli map following the equation:

$$X_n = 2(X_{n-1} + e(n))(\bmod 1.0) \quad (3)$$

where e(n) is a Gaussian noise signal.

Finally, according to the third technique, an oscillator sampling can be used in order to realize a random generator, where a random signal is obtained starting from the phase noise of an oscillator.

In particular, an output signal from a fast oscillator is sampled by means of a D-type flip-flop (DFF) receiving as clock signal an output signal of a slow oscillator. In such a case, the evolution of the fast oscillator guarantees random samples obtained from the DFF, by simply fixing the oscillators frequencies ratio.

The analog systems just described (also known as TRUE RANDOM) have the main advantage of furnishing all random sequences. However, they require a deep attention during the design phase. It is in fact too simple that a minor imperfection in the system so realized degrades the performance of the system itself in such a way that it can no more be used.

BRIEF SUMMARY OF THE INVENTION

Embodiments of the invention provide an architecture for realizing a random numbers generator, having structural and functional features that overcome the drawbacks of the known systems.

One concept behind embodiments of this invention is that of using the advantageous features of digital and analog systems contemporaneously. In this way, the operation of a hybrid system so obtained is guaranteed for any operational condition indeed.

In particular, when the analog (or true random) circuitry portion does not work, a pseudo-random sequence is notwithstanding assured by the digital circuitry portion. When, on the contrary, the analog circuitry portion is able to provide for an acceptable sequence, the digital circuitry portion would use it as a "seed" for generating a sequence having an even longer period with respect to the usual one.

The features and advantages of the hybrid architecture according to the present inventions will be apparent from the following description of an embodiment thereof, given as a non limitative example with reference to the annexed drawings.

DETAILED DESCRIPTION OF THE INVENTION

Figure 1:
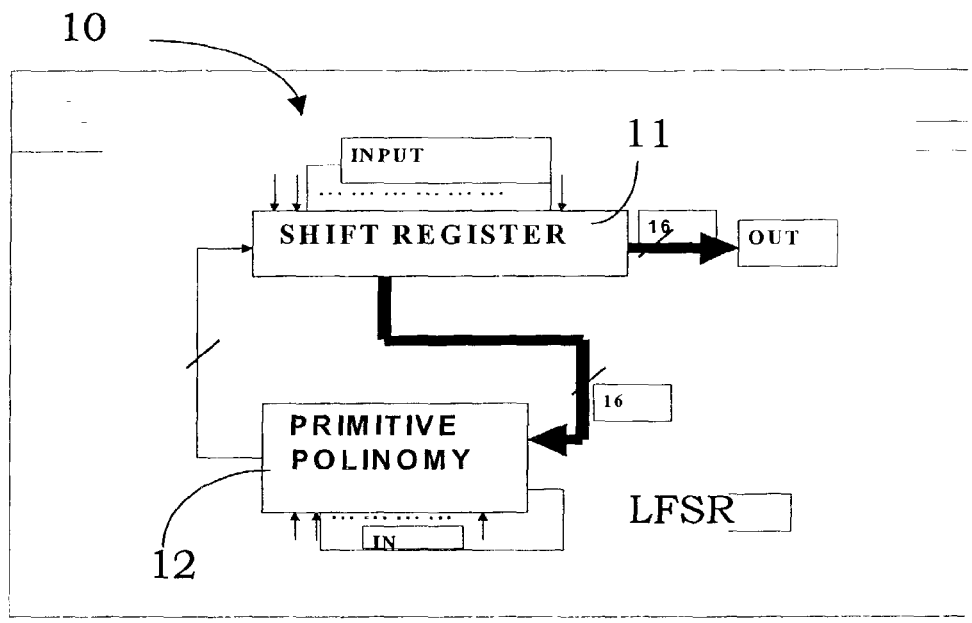
FIG. 1 schematically shows a digital circuitry for generating a pseudo-random numbers sequence according to the prior art.
Figure 2:
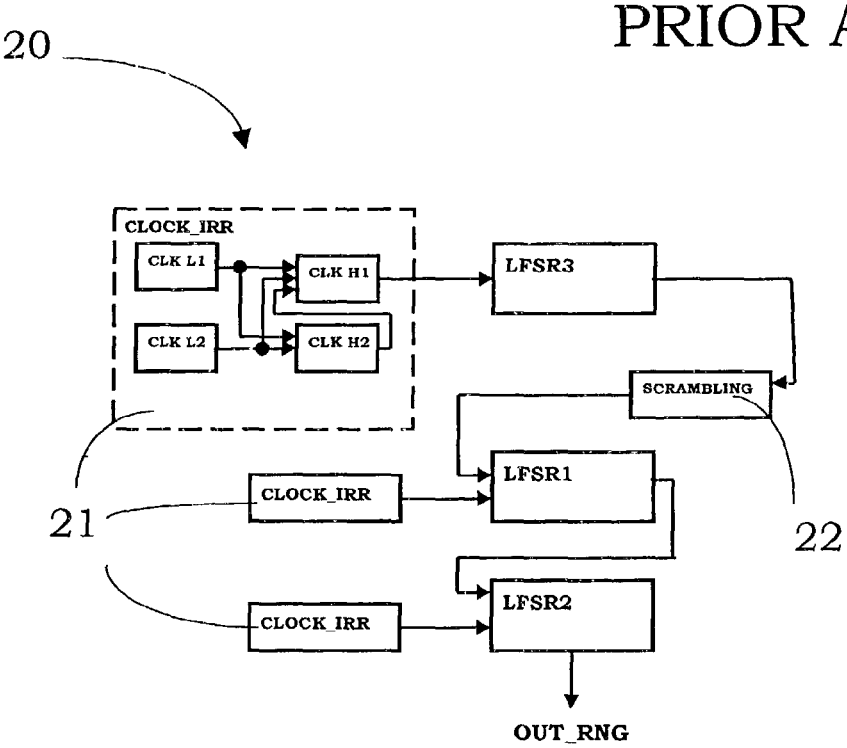
FIG. 2 schematically shows a further digital circuitry according to the prior art.
Figure 3:
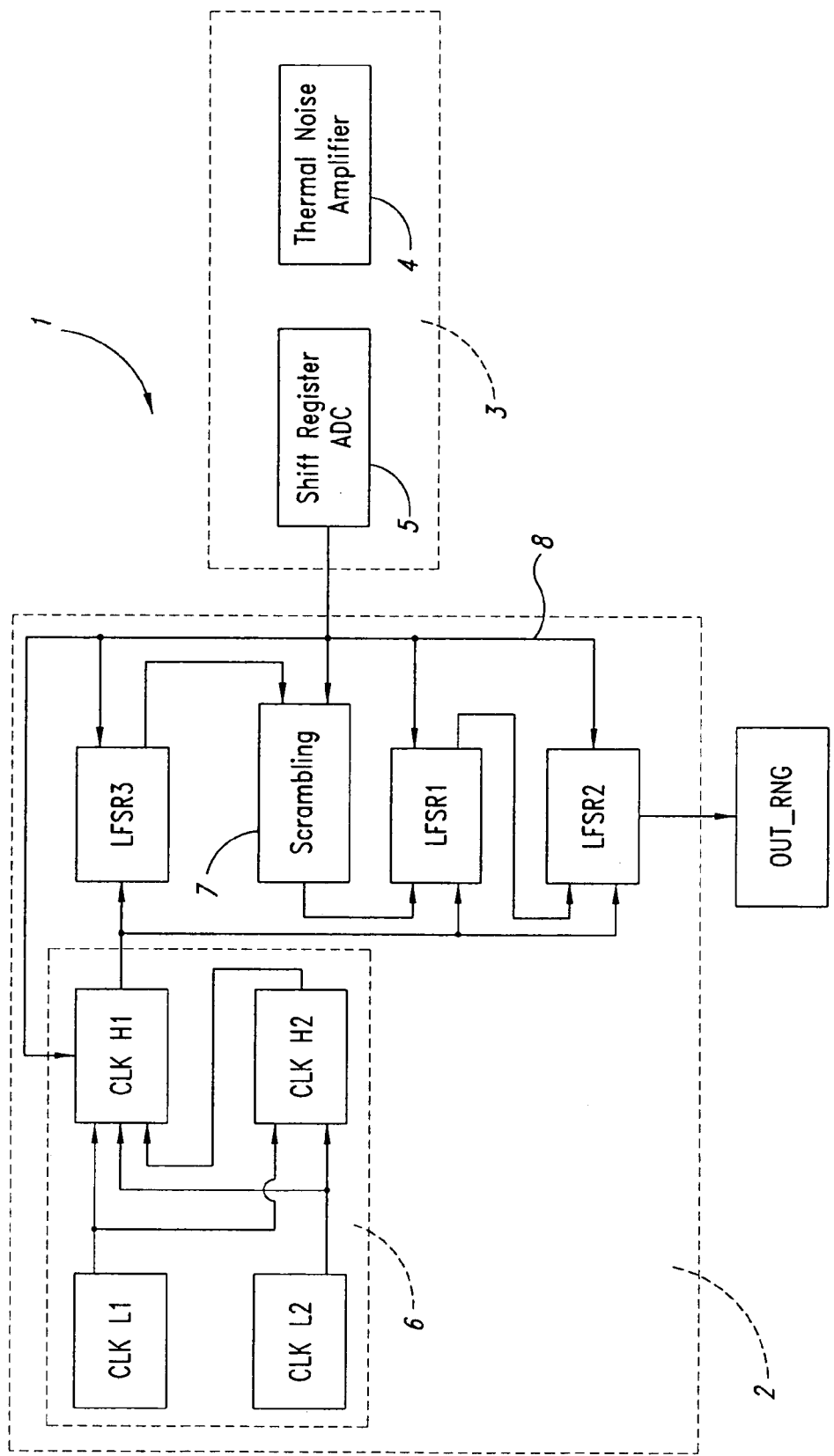
FIG. 3 schematically shows a hybrid architecture for realizing a random numbers generator according to an embodiment of the invention.

With reference to the above listed figures and in particular to FIG. 3, at 1 is generally and schematically shown a hybrid architecture for realizing a random numbers generator.

According to the solution shown in FIG. 3, the hybrid architecture 1 comprises a digital circuitry portion 2 as well as an analog circuitry portion 3.

In particular, advantageously according to an embodiment of the present invention, the analog circuitry portion 3 of the hybrid architecture 1 comprises a thermal noise amplifier 4 which is usefully digitalized.

The output bits stream from such a thermal noise amplifier is used to modify the operation of the digital circuitry portion 2 in the hybrid architecture 1.

In particular, the analog circuitry portion 3 is a random number generator that includes a thermal noise amplifier 4 that furnishes a square-wave signal starting from an amplified thermal noise. Such a signal is then used to charge a shift register 5 within the analog circuitry portion 3.

Moreover, the digital circuitry portion 2 comprises a first LFSR1, a second LFSR2 and a third register LFSR3, receiving an irregular clock signal issued by a clock generator 6 in turn comprising a set of clock oscillators CLK L1, CLK L2, CLK H1, CLK H2.

In particular, within the clock generator 6, the clock oscillator CLK L1 is connected to the clock oscillators CLK H1 and CLK H2, the clock oscillator CLK L2 is connected to the clock oscillators CLK H1 and CLK H2, the clock oscillator CLK H2 is connected to the clock oscillator CLK H1. Moreover, the output of the clock oscillator CLK H1 is connected to the registers LFSR1, LFSR2, LFSR3.

The first register LFSR1 is connected to the second register LFSR2, in turn connected to an output terminal OUT_RNG of the digital circuitry portion 2.

Finally, the third register LFSR3 is connected to the first register LFSR1 by means of a scrambling device 7.

An output of the shift register 5 is connected to a bus 8 that can be used in interactions with the digital circuitry portion 2 in the hybrid architecture 1 for realizing a random numbers generator.

In particular, advantageously according to a preferred embodiment of the invention, the registers LFSR1, LFSR2 and LFSR3 as well as the clock oscillator CLK H2 within the clock generator 6 are connected to the bus 4.

In such a way, the irregular or relaxation oscillators frequencies are changed, such oscillators being comprised in the clock generator 6 and being used to trigger the LFSRs speed within the digital circuitry portion 2.

Such frequencies changes are obtained by increasing or decreasing, by means of suitable switches connected to the bus 8, the values of the capacitors that regulate the intrinsic period length within such relaxation oscillators CLK L1, CLK L2, CLK H2, and CLK H2.

The signal output by the analog noise generator 3 on the bus 8 also varies the logic of the scrambling device 7, which is connected to the bus 8, and which scrambles the data flowing from LFSR3 register to LFSR1 register.

Finally, the contents of the three LFSRs in the digital circuitry portion 2 are changed in such a way to cause an unconditional jump within such registers.

All the above provide for an evolution in the digital circuitry portion comprised in the hybrid architecture 1 always in a different manner, departing well away from its own period.

It should be noted that the hybrid architecture 1 according to an embodiment of the present invention, even without the analog portion 3, comprises a digital filter to smooth the distribution in case of malfunctioning.

In order to appreciate the enhancement obtained by adding a noisy model to a known digital realization of a random numbers generator made by LFSRs, a simulation has been performed by the Applicants.

It should be noted, however, that the true gain obtained by means of an integrated solution of the random number generator according to embodiments of the present invention should be really higher, since the above described hybrid architecture 1 has been conceived in order to overcome manufacturing mistakes that cannot be shown in a simulation.

To evaluate the random number generator's quality, statistical tests have been used, that show when the so obtained numbers distribution is to be considered as random.

In particular, the used tests are comprised in the FIPS 140-1 standard and have been performed on a 20,000 bit sample having the following features:

Count of 0s.
POKER TEST $$\frac{16}{5000}\sum_{i=0}^{15} f^2(i) - 5000$$

where f(i) is the sum of occurrences of 4 bits groups.

RUN TEST (that counts maximum length sequences of 0s or 1s)

Count of sequences of 0s or 1s having a length of more than 26 bits

Shown in Table I are the constraints fixed for these tests.

TABLE I

| TEST TYPE | MIN | MAX |
| --- | --- | --- |
| Number of 0s | 9725 | 10275 |
| Poker test | 2.16 | 46.17 |
| Run length 1 | 2657 | 2343 |
| Run length 2 | 1365 | 1135 |
| Run length 3 | 708 | 542 |
| Run length 4 | 373 | 251 |
| Run length 5 | 201 | 111 |
| Run length 6+ | 201 | 111 |
| Long run | 0 | 0 |

The results obtained according to the above constraints are as follows:
1) Without noise:

TABLE II

| TEST TYPE | Result | Margin |
| --- | --- | --- |
| Number of 0s | 9896 | 104 |
| Poker test | 14.02 | 10.05 |
| Run of 0s length 1 | 2493 | 7 |
| Run of 0s length 2 | 1224 | 26 |
| Run of 0s length 3 | 647 | 22 |
| Run of 0s length 4 | 342 | 30 |
| Run of 0s length 5 | 148 | 8 |
| Run of 0s length 6+ | 160 | 4 |
| Run of 1s length 1 | 2496 | 4 |
| Run of 1s length 2 | 1313 | 63 |
| Run of 1s length 3 | 632 | 7 |
| Run of 1s length 4 | 293 | 19 |
| Run of 1s length 5 | 133 | 32 |
| Run of 1 length 6+ | 148 | 8 |
| Long run | 0 | 0 |

2) With noise:

TABLE III

| TEST TYPE | Result | Margin |
|---|---|---|
| Number of 0s | 9950 | 50 |
| Poker test | 18.76 | 5.41 |
| Run of 0s length 1 | 2533 | 33 |
| Run of 0s length 2 | 1263 | 13 |
| Run of 0s length 3 | 588 | 37 |
| Run of 0s length 4 | 299 | 13 |
| Run of 0s length 5 | 175 | 19 |
| Run of 0s length 6+ | 155 | 1 |
| Run of 1s length 1 | 2536 | 36 |
| Run of 1s length 2 | 1238 | 12 |
| Run of 1s length 3 | 598 | 27 |
| Run of 1s length 4 | 310 | 2 |
| Run of 1s length 5 | 171 | 15 |
| Run of 1s length 6+ | 160 | 4 |
| Long run | 0 | 0 |

In conclusion, the hybrid architecture 1 n, that mixes a digital circuitry portion 2, able to provide for a random bytes sequence, and an analog circuitry portion 3, able to provide a "seed" of the true random type, allows an enhancement of the statistic features of the random numbers generator so obtained.

In particular, a better distribution uniformity as well as a higher output unpredictability is obtained by the generator realized by means of such a hybrid architecture.

Changes can be made to the invention in light of the above detailed description. In general, in the following claims, the terms used should not be construed to limit the invention to the specific embodiments disclosed in the specification and the claims, but should be construed to include all methods and devices that are in accordance with the claims. Accordingly, the invention is not limited by the disclosure, but instead its scope is to be determined by the following claims.

The invention claimed is:

1. A hybrid architecture for realizing a random numbers generator, comprising:
    a digital circuitry portion, able to provide for a random bytes sequence; and
    an analog circuitry portion coupled to the digital circuitry portion and able to provide a true random seed, wherein the analog circuitry portion includes an output bus connected to the digital circuitry portion and the digital circuitry portion comprises:
    a plurality of linear feedback shift registers connected to the output bus of the analog circuitry portion; and
    a clock generator comprising a plurality of clock oscillators structured to provide an irregular clock signal to the linear feedback shift registers.

2. The hybrid architecture of claim 1, wherein the analog circuitry portion comprises a thermal noise amplifier.

3. The hybrid architecture of claim 2, wherein the thermal noise amplifier is digitalized.

4. The hybrid architecture of claim 3, wherein the thermal noise amplifier provides an output bit stream to the digital circuitry portion.

5. The hybrid architecture of claim 2, wherein the thermal noise amplifier furnishes a square-wave signal starting from an amplified thermal noise, and the analog circuitry portion includes a shift register that is charged by the square-wave signal.

6. The hybrid architecture of claim 1, wherein each linear feedback shift register of the plurality of linear feedback registers includes a first input coupled to an output of the clock generator, a second input coupled to the output bus of the analog circuitry portion, and an output; the output of each linear feedback shift register, except for a last one of the linear feedback shift registers, being connected to a third input of another one of the linear feedback shift registers.

7. The hybrid architecture of claim 1, wherein the digital circuitry portion further comprises a scrambling device inserted between first and second registers of the plurality of linear feedback shift registers, the scrambling device being in turn connected to the output bus of the analog circuitry portion.

8. The hybrid architecture of claim 1, wherein at least one of the plurality of clock oscillators of the clock generator is in turn connected to the output bus of the analog circuitry portion.

9. The hybrid architecture of claim 8, wherein the at least one of the plurality of clock oscillators comprises a switch connected to the output bus of the analog circuitry portion.

10. A random numbers generator comprising:
    a digital circuitry portion;
    an analog circuitry portion; and
    a bus connecting the analog circuitry portion to the digital circuitry portion, wherein the digital circuitry portion comprises:
    a clock generator in turn comprising a plurality of clock oscillators structured to output an irregular clock signal; and
    a plurality of linear feedback shift registers, each having a first input connected to an output of the clock generator and a second input connected to the bus.

11. The generator of claim 10, wherein the analog circuitry portion comprises a digitalized thermal noise amplifier providing an output bit stream.

12. The generator of claim 11, wherein the analog circuitry portion furnishes a square-wave signal starting from an amplified thermal noise, the square-wave signal being used to charge a shift register within the analog circuitry portion.

13. The generator of claim 10, wherein the plurality of linear feedback shift registers includes first and second linear feedback shift registers, the first linear feedback shift register having an output and the second linear feedback shift register including a third input coupled to the output of the first linear feedback shift register and an output that provides an output of the digital circuitry portion.

14. The generator of claim 10, wherein the digital circuitry portion further comprises a scrambling device inserted between first and second registers of the plurality of linear feedback shift registers, the scrambling device being in turn connected to the bus.

15. The generator of claim 10, wherein at least one of the plurality of clock oscillators of the clock generator is in turn connected to the bus.

16. The generator of claim 10, wherein the at least one of the plurality of clock oscillators comprises a switch connected to the bus.

17. A method for generating a random number comprising the following phases:
    providing a first random sequence by means of an analog circuitry portion of a random numbers generator; and
    providing a random number by means of a digital circuitry portion of a random numbers generator using the first random sequence as a starting sequence, wherein said phase of providing a random number by means of the digital circuitry portion of the random numbers generator comprises a phase of changing of frequencies of a plurality of clock oscillators comprised in the digital circuitry portion in function of said first random sequence obtained by means of the analog circuitry portion of the random numbers generator.

18. The method of claim 17, wherein said phase of providing a random number by means of the digital circuitry portion of the random numbers generator comprises a phase of causing an unconditional jump within each of a plurality of linear feedback shift registers comprised in the digital circuitry portion in function of said first random sequence obtained by means of the analog circuitry portion of the random numbers generator.

19. The method of claim 17, wherein said phase of providing a random number by means of the digital circuitry portion of the random numbers generator comprises a phase of changing a logic of a scrambling device comprised in the digital circuitry portion in function of said first random sequence obtained by means of the analog circuitry portion of the random numbers generator.

* * * * *